United States Patent [19]
Walker

[11] Patent Number: 4,617,131
[45] Date of Patent: Oct. 14, 1986

[54] METHOD AND SYSTEM OF CLEANSING A FILTER BED

[75] Inventor: Kenneth A. Walker, Lutherville, Md.

[73] Assignee: Environmental Elements Corp., Baltimore, Md.

[21] Appl. No.: 760,258

[22] Filed: Jul. 29, 1985

[51] Int. Cl.4 .............................................. B01D 41/02
[52] U.S. Cl. .................................... 210/794; 210/798; 210/277; 210/278
[58] Field of Search .............. 210/277, 278, 279, 276, 210/275, 792, 793, 794, 795, 796, 797, 798, 195.3

[56] References Cited
U.S. PATENT DOCUMENTS
3,533,507 10/1970 Ealing .................................. 210/412

Primary Examiner—Frank Sever

[57] ABSTRACT

An improved method of cleansing a filter bed is herein provided utilizing a backwash pump (12) having an inlet line (14) and an outlet line (16). The improved method and system includes two cycle operations. Initially, the filter bed is backwashed to remove contaminants from the filter bed with the backwash pump (12) drawing liquid from an effluent channel (26). A portion of the liquid passing on backwash pump outlet line (26) is passed through a bypass adjustment valve (34) for egress on an outlet line (38) for recirculation to the effluent channel (26). The second stage of the cleansing operation is through a purging cycle where the filter bed is purged subsequent to the backwashing operation for removal of further contaminants from the filter bed. In the purging cycle, a closed loop system is formed between the backwash pump (12) and the backwash shoe (28) with a portion of liquid being diverted through a purge adjustment valve member (44) for egress on an outlet line (46) external to the system or to a separate filter member.

21 Claims, 2 Drawing Figures

METHOD AND SYSTEM OF CLEANSING A FILTER BED

BACKGROUND OF THE INVENTION

1. Field of the Invention

This invention pertains to an improved system and method of cleansing a filter bed. In particular, this invention relates to automatic backwash filtering systems. More in particular, this invention directs itself to an improved system for cleansing a filter bed utilizing two separate and distinct operations including a backwashing cycle and a purging cycle. Further, this invention pertains to an automatic backwashing filter system which permits substantial utilization of the same fluid flow elements in both a backwashing operation and a purging operation.

2. Prior Art

Automatic backwash filter systems are known in the art as exemplified in U.S. Pat. Nos. 3,239,061 and 4,133,766 assigned to the assignee corporation of this invention concept. However, such automatic backwash filters provide for a singular backwashing operation of the filter beds. It has been found in such prior art systems that there is a possibility that particulate solid contaminants or organisms have been found at the bottom of the filter media bed subsequent to the backwashing operation. In such prior art systems there is a possibility that the particulate material may pass through the filter underdrain and contaminate the filtrate.

Such prior art systems do not purge the filter bed subsequent to the backwashing operation cycle for removal of further contaminants from the filter bed. Thus, in such prior art filtering systems, the safety factor does not provide for a maximization of the filtering of the overall filtering system.

Additionally, where it would be necessary to insert a purge cycle into the prior art filtering systems, such would be complicated by additional hardware and pumping consideration mechanisms which would greatly increase the cost of such prior art systems. Further, the additional hardware and pumping elements would increase the volume considerations of such filtering systems.

INCORPORATION BY REFERENCE

U.S. Pat. Nos. 3,239,061 and 4,133,766 assigned to the same assignee corporation as the subject invention concept are herein incorporated by reference.

SUMMARY OF THE INVENTION

A method of cleansing a filter bed having a backwash pump with an inlet line and an outlet line. Initially, the filter bed is backwashed for removing contaminants from the filter bed. The backwash pump draws liquid from an effluent channel. Subsequent to the backwashing cycle operation, the filter bed is purged for removal of further contaminants from the filter bed.

DESCRIPTION OF THE PREFERRED EMBODIMENTS

Figure 1:
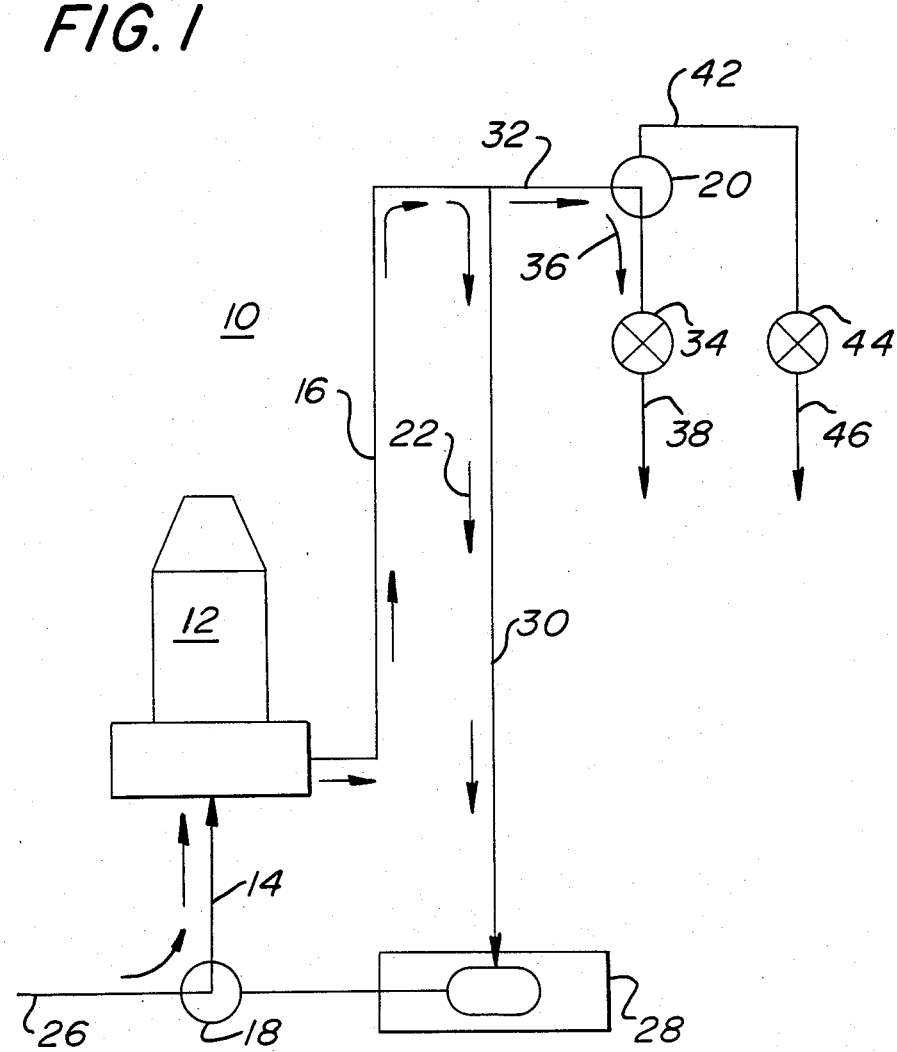
FIG. 1 is a schematic block diagram of the improved method and system of cleansing the filter bed showing the backwashing operation cycle; and, FIG. 2 is a schematic block diagram of the improved method and system of cleansing a filter bed showing the purge cycle.
Figure 2:
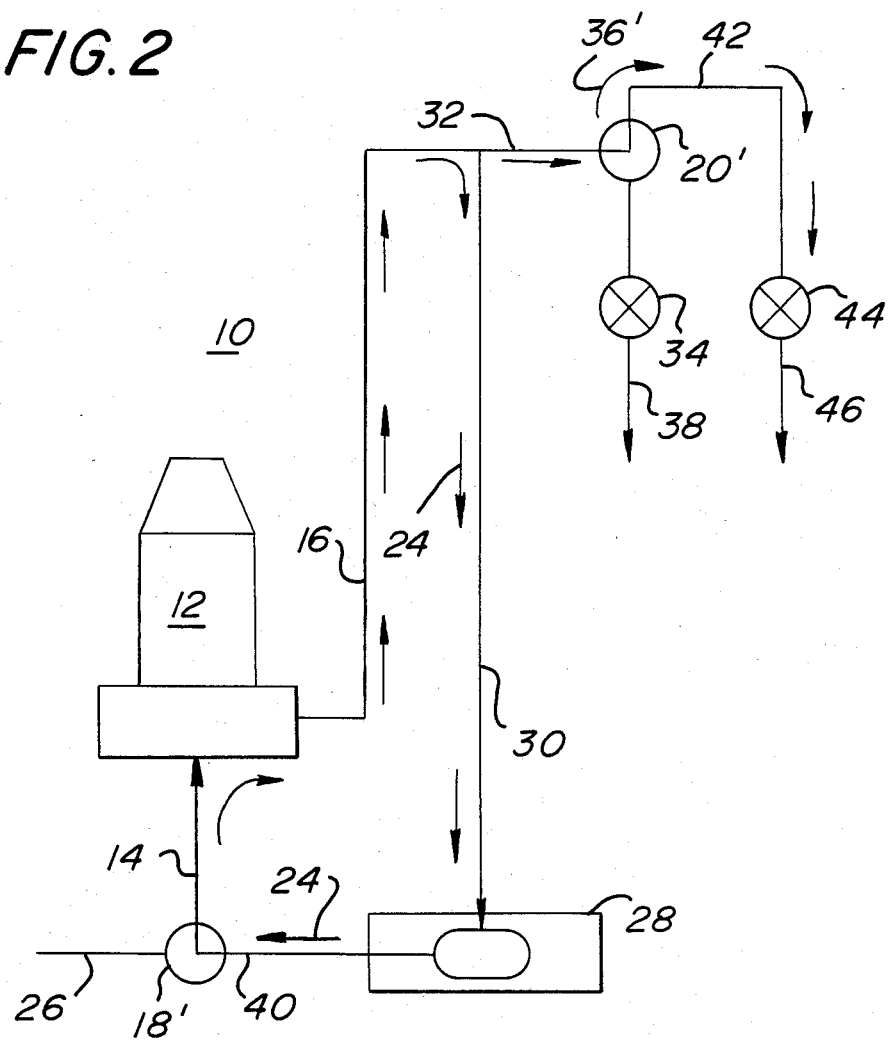

Referring now to FIGS. 1 and 2, there is shown block diagrams relating to improved filter bed cleansing system 10. The subject filter bed cleansing system 10 is an improvement of cleansing systems shown and described in U.S. Pat. Nos. 3,239,061 and 4,133,766 assigned to the same assignee corporation as the subject cleansing system 10. In overall concept, improved filter bed cleansing system 10 is directed to automatic backwash filters which remove solid contaminants from water and waste water by passing the fluid through a bed of granular media. As contaminant solids accumulate in a filter bed the flow through the filter bed is reversed to dislodge collected particulate matter. The overall automatic backwash filter system as shown and described in the aforementioned U.S. patents generally consist of backwash pump 12 to direct flow in a reversed manner back through the media and may include in general a second pump and collecting hood to trap any released solids for removal from the overall system. For purposes of description, this cleansing operation in following paragraphs will be referred to as a backwash cycle and is shown in block diagram FIG. 1.

Subsequent to backwashing of filter cells it has now been found that there is a possibility that extremely fine solid contaminants or organisms may be transported to the bottom of the disturbed filter media bed and this material may possibly pass through the filter underdrain and deleteriously contaminate the final filtrate. In some filtering system applications, material passing through the filter underdrain and contaminating the final filtrate has been found to be critical such as in a virus elimination application. It has thus been determined that it may be of importance in various applications to increase the safety factor of the overall filtering system by diverting the filtrate to waste for a predetermined time interval after each filtering cell goes through the backwash cycle as shown in FIG. 1.

In order to divert the filtrate to waste for a predetermined time interval after each filter cell goes through the backwash cycle, it has been determined that a purge cycle as shown by block diagram FIG. 2 may be utilized. To accommodate a purge cycle as herein described, it is of importance to utilize a single backwash filter pump 12 incorporated on existing automatic backwash filter systems. The utilization of a single backwash filter pump 12 to accommodate both the backwash cycle shown in FIG. 1 and the purge cycle shown in FIG. 2 is important in that complicated and additional pumping elements may be eliminated as well as allowing for low volume constraints of the overall filtering system. Due to the fact that it is important to use a singular backwash filter pump 12, such led to problems since the normal filter flow rate is exceedingly lower than the backwash flow rate. Thus, backwash filter pump 12 must be throttled or recirculated in order to prevent drawing excessive flow through the media during the purge phase or cycle shown in FIG. 2. Any excessive flow through the media may cause a breakthrough of contaminants through the filter media bed and vitiate the effectiveness of the filtering system.

Since throttling of normal backwash filter pumps 12 may not be obtained through large pressure head differences, a new piping system including a plurality of control valves for redirecting the flow of backwash pump 12 was devised in a manner such that the flow of filtered water may be drawn from the filter cell cleansed during the backwashing operation. For ease of simplicity in operation, it has been found that it is necessary to provide the same basic operating elements for both the backwash cycle as shown in FIG. 1 and the purge cycle operation as shown in FIG. 2. The concatenation of problem areas associated with the restraints as herein before described, has been solved by utilization of the basic operating elements and method with associated flow diversion shown in FIGS. 1 and 2.

Referring now to the backwash cycle as shown in FIG. 1 utilizing the concatenation of operating mechanisms which allows for the identical mechanisms to be utilized in both the backwash operation cycle of FIG. 1 as well as the purge cycle of FIG. 2, there is shown backwash filter pump 12 having backwash filter pump inlet line 14 and backwash filter pump outlet line 16. Incorporated in filter bed cleansing system 10 are first and second diverter valves 18 and 20. In FIG. 2, the diverter valves are given the element numbers 18' and 20' in order to differentiate the operating modes of the diverter valves for providing differing flow paths between the backwash cycle operation and the purge cycle operation.

First and second diverter valves 18 and 20 are commercially available solenoid operated valve members and one such set of valves is manufactured by Automatic Switch company of Florham, Park, N.J. having a model number 8335B13. Diverter valves 18 and 20 are generally two-way valves for directing the liquid flow path as shown by the directional arrow notation 22 on FIG. 1 and the directional arrow notation 24 as shown on FIG. 2.

Referring to FIG. 1, the backwashing operation backwashes the filter system filter bed to initially remove contaminants from the filter bed with backwash pump 12 drawing liquid from effluent channel 26 through first diverter valve member 18 into backwash filter pump inlet line 14 and internal to backwash filter pump 12. Liquid is then egressed through backwash filter pump outlet line 16. Liquid flow 22 is then branched with a first portion of the liquid being pumped from backwash pump outlet line 16 to backwash shoe 28 through backwash shoe inlet line 30 as is shown.

In order to control the pressure head of the first portion of liquid passing through backwash shoe inlet line 30, a second portion of liquid is passed through bypass line 32 and second diverter valve 20 into bypass flow adjustable valve 34 as depicted by flow directional arrows 36. Flow egresses from bypass adjustable flow valve member 34 through bypass adjustable flow valve outlet line 38 wherein this flow may be recirculated or discharged back to effluent channel 26. Thus, as is shown, flow into the underdrain may be adjusted by opening bypass adjusting valve 34 to allow some flow to recirculate and the flow 22 into backwash shoe 28 passes to the underdrain as is well known in the art.

Referring now to the purge cycle operation shown in FIG. 2, such is initiated subsequent to the backwashing operation shown in FIG. 1. In general, a first purging portion of liquid pumped by backwash pump 12 is recirculated on backwash pump outlet line 16 and backwash shoe inlet line 30 to backwash shoe 28 and then returned to backwash pump 12 through backwash shoe outlet line 40. The recirculation portion of the liquid flow is shown by directional arrow elements 24 forming a closed loop including backwash pump 12 and backwash shoe 28. Thus, backwash pump 12 is fluidly coupled to backwash shoe 28 by first diverter valve 18' being placed in the position shown in FIG. 2 in order to provide the fluid coupling between backwash pump 12 and backwash shoe 28.

As has been previously described, first diverter valve 18 establishes fluid coupling between effluent channel 26 and backwash 12 during the backwashing of the filter bed as is indicated by the fluid flow position of first diverter valve 18 in FIG. 1. Additionally, the first diverter 18' establishes a fluid coupling between backwash shoe 28 and backwash pump 12 during purging of the filter bed as is indicated by the positional location of first diverter valve 18' shown in FIG. 2.

A second purging portion of liquid pumped by backwash pump 12 on backwash pump outlet line 16 is bled to bypass line 32 and is acted upon by second diverter valve 20' for passage into purge adjusting valve input line 42. In this manner, purge adjusting valve member 44 is fluidly coupled to backwash pump 12. The second portion of liquid being bled thus passes through purge adjusting valve member 44 and egresses on purge adjusting valve member output line 46 for passage to a filter member for refiltering or may be passed to a waste tank, not important to the inventive concept as herein described.

In the backwash cycle operation as depicted in FIG. 1, liquid is drawn from effluent channel 26 through backwash pump 12 and to backwash shoe 28. A first portion of the liquid is bled through line 32 and second diverter valve 20 to pass through bypass adjustable flow valve 34 for egress on bypass adjustable flow valve outlet line 38 for discharge back into effluent channel 26 which allows a bleed off of backwash liquid so that it recirculates in effluent channel 26.

The hydraulics of filter bed cleansing system 10 dictate that during the backwash operation, a substantial amount of flow is needed to pass from effluent channel 26 and discharge into backwash shoe 28 in the underdrain of the filtering system. The backwashing operation calls for a flow of approximately 15.0 gallons per square foot of filter bed being cleaned, however, during a normal filter cycle, the flow of liquid to the filter is only approximately 2.0 gallons per square foot of filter bed.

In the event that backwash pump 12 were allowed to draw liquid during the purge cycle at the normal backwash flow rate of 15 gallons per square foot, there would be a substantial spike or increase of purge flow as opposed to normal filter flow. Liquid would be drawn through the filter bed at a rate of 15.0 gallons per minute per square foot as opposed to approximately 2.0 gallons per minute per square foot normally obtained during a filtering cycle.

This increase of flow would tend to draw solids through the filter bed and decrease to a substantial degree the filtering performance of the system.

Thus, one of the objectives of improved filter bed cleansing system 10 is to be able to pull flow and empty out the flow from the filter bed in the underdrain that potentially contaminates water with this flow at essentially the same rate as if such were allowing the filter to pass flow during its normal filtering cycle. Improved filter bed cleansing system 10 allows water to be backwashed through the filter at a rate of approximately 15.0 gallons per minute per square foot during the backwashing cycle and in the purge cycle to draw such out at approximately 2.0 gallons per minute per square foot with the identical backwash filter pump 12 being utilized for both cycles.

Commercially available backwashing filter pumps 12 do not allow throttling of such pumps in a practical manner since such pumps tend to operate in an unstable portion of the pump flow characteristic curves.

During the purging cycle as depicted in FIG. 2, backwash pump 12 pumps liquid through conduits 16 and 30 to backwash shoe 28 and then through line 40 for reinsertion into backwash pump 12 in a closed loop fashion. Simultaneously, a second portion of the liquid is bled off through line 32, second diverter valve 20', line 42, through purge adjustable valve 44 to egress line 46 as has been described. Purge adjusting valve member 44 is adjusted so that approximately 2.0 gallons per minute per square foot is bled off and such is allowed to discharge through outlet line 46. This amount of liquid passing external to the system is then made up by drawing liquid through line 40 from backwash shoe 28 and the associated underdrain. Thus, backwash pump 12 is actually pumping at approximately 15.0 gallons per minute per square foot to cause a net withdrawal from the underdrain of approximately 2.0 gallons per minute per square foot through backwash shoe 28 and discharges such through the associated piping elements as has previously been discussed.

Although a number of valve mechanisms are commercially available and acceptable in operation of the improved filter bed cleansing system 10, purge adjusting valve 44 and bypass adjustable flow valve 34 may be valve members manufactured by Automatic Switch Company of Florham, N.J. having a model designation number 8335B45.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method of cleansing a filter bed having a backwash pump having an inlet line and an outlet line including the steps of:
  (a) backwashing said filter bed for initially removing contaminants from said filter bed, said backwash pump drawing liquid from an effluent channel; and,
  (b) purging said filter bed subsequent to said backwashing for removal of further contaminants from said filter bed, said step of purging said filter bed including the step of recirculating a first purging portion of liquid pumped by said backwash pump on said backwash pump outlet line through said backwash shoe for return to said backwash pump through said backwash pump inlet line.

2. The method of cleansing a filter bed as recited in claim 1 where the step of backwashing includes the step of passing a first portion of liquid being pumped through said backwash pump outlet line to a backwash shoe through a backwash shoe inlet line in fluid communication with said backwash pump outlet line.

3. The method of cleansing a filter bed as recited in claim 2 where the step of backwashing includes the step of controlling the pressure of said first portion of liquid passing through said backwash shoe inlet line.

4. The method of cleansing a filter bed as recited in claim 3 where the step of controlling said first portion of said liquid includes the step of passing a second portion of liquid being pumped through said backwash pump outlet line through a bypass flow adjustable valve member.

5. The method of cleansing a filter bed as recited in claim 3 where the step of fluidly coupling includes the step of inserting a second diverter valve between said purge adjusting valve member and said backwash pump outlet line.

6. The method of cleansing a filter bed as recited in claim 5 where said second diverter valve is a two-way diverter valve.

7. The method of cleansing a filter bed as recited in claim 1 where the step of recirculating said first purging portion of liquid includes the step of fluidly coupling said backwash pump to said backwash shoe.

8. The method of cleansing a filter bed as recited in claim 7 where the step of fluidly coupling includes the step of inserting a first diverter valve between said backwash pump inlet line and a backwash shoe outlet line for providing fluid communication between said backwash pump and said backwash shoe.

9. The method of cleansing a filter bed as recited in claim 8 where said first diverter valve is a two way diverter valve.

10. The method of cleansing a filter bed as recited in claim 9 where said first diverter valve is in fluid communication with said backwash pump inlet line, said backwash shoe outlet line and said effluent channel.

11. The method of cleansing a filter bed as recited in claim 10 where said first diverter valve (1) establishes fluid coupling between said effluent channel and said backwash pump during backwashing of said filter bed, and, (2) establishes fluid coupling between said backwash shoe and said backwash pump during purging of said filter bed.

12. The method of cleansing a filter bed as recited in claim 1 where the step of purging said filter bed includes the step of bleeding a second purging portion of liquid pumped by said backwash pump on said backwash pump outlet line, said second purging portion of said liquid being passed to a filter member or to waste.

13. The method of cleansing a filter bed as recited in claim 12 where the step of bleeding said second purging portion of said liquid includes the step of diverting said second purging portion of said liquid to a purge adjusting valve member.

14. The method of cleansing a filter bed as recited in claim 13 where the step of diverting includes the step of fluidly coupling said purge adjusting valve member to said backwash pump.

15. An improved media filter cleansing system having a filter tank divided into a multiplicity of cells, a bed of filter media located on support plates mounted within said cells, influent means for delivering fluid to be treated to the top of said filter media bed and backwashing means for driving a backwashing fluid upward through said filter bed for removing contaminants contained therein wherein the improvement comprises:
  (a) means for recirculating a first portion of cleansing liquid from a backwash pump to a backwash shoe and to an inlet line of said backwash pump; and,
  (b) means for purging a second portion of said cleansing liquid from an outlet line of said backwash pump to an external filter or waste launder subsequent to backwashing for removal of further contaminants from said filter bed.

16. The improved media filter cleansing system as recited in claim 15 where said recirculation means includes
    (a) a backwash shoe outlet line member in fluid communication with said backwash shoe; and,
    (b) a first diverter valve member for fluidly coupling said backwash shoe outlet line to said backwash pump inlet line.

17. The improved media filter cleansing system as recited in claim 16 where said first diverter valve member is a two-way valve.

18. The improved media filter cleansing system as recited in claim 16 where said first diverter valve member (1) fluidly couples said backwash pump to an effluent channel during a backwashing operation of said filter media, and, (2) fluidly couples said backwash shoe to said backwash pump during a purging operation.

19. The improved media filter cleansing system as recited in claim 15 where said purging means includes:
    (a) a purge valve member; and,
    (b) a second diverter valve member for fluidly coupling said backwash pump outlet line to said purge valve member.

20. The improved media filter cleansing system as recited in claim 19 where said second diverter valve member is a two-way valve.

21. The improved media filter cleansing system as recited in claim 19 where said second diverter valve member (1) fluidly couples said backwash pump to a bypass adjusting valve during a backwashing operation of said filter media, and, (2) fluidly couples said backwash pump to said purge valve member during a purging operation.

* * * * *